US010474379B2

(12) United States Patent
White et al.

(10) Patent No.: US 10,474,379 B2
(45) Date of Patent: Nov. 12, 2019

(54) CONTROLLED ACCESS TO STORAGE

(71) Applicant: NE One LLC, Lyman, ME (US)

(72) Inventors: Stephen P. White, Lyman, ME (US); John F. Buckhoff, III, West Bath, ME (US)

(73) Assignee: NE One LLC, Lyman, ME (US)

( * ) Notice: Subject to any disclaimer, the term of this patent is extended or adjusted under 35 U.S.C. 154(b) by 0 days.

(21) Appl. No.: 15/884,646

(22) Filed: Jan. 31, 2018

(65) Prior Publication Data

US 2018/0217772 A1 Aug. 2, 2018

Related U.S. Application Data

(60) Provisional application No. 62/452,748, filed on Jan. 31, 2017.

(51) Int. Cl.
*G06F 3/06* (2006.01)
*G06F 21/31* (2013.01)
*G06F 1/3287* (2019.01)
*G06F 11/14* (2006.01)

(52) U.S. Cl.
CPC .......... *G06F 3/0622* (2013.01); *G06F 1/3287* (2013.01); *G06F 3/065* (2013.01); *G06F 3/067* (2013.01); *G06F 3/0619* (2013.01); *G06F 3/0625* (2013.01); *G06F 3/0634* (2013.01); *G06F 3/0685* (2013.01); *G06F 11/14* (2013.01); *G06F 21/31* (2013.01); *G06F 2221/2111* (2013.01)

(58) Field of Classification Search
None
See application file for complete search history.

(56) References Cited

U.S. PATENT DOCUMENTS

| 5,276,865 | A | 1/1994 | Thorpe |
| 5,850,559 | A | 12/1998 | Angelo et al. |
| 7,346,790 | B1 | 3/2008 | Klein |
| 7,472,300 | B1 * | 12/2008 | Haustein ............... G06F 1/3215 713/323 |
| 9,304,581 | B1 * | 4/2016 | Robillard ................. G06F 3/06 |
| 2004/0054939 | A1 * | 3/2004 | Guha .................... G06F 1/3203 713/300 |

(Continued)

FOREIGN PATENT DOCUMENTS

WO WO2014/111920 A1 7/2014

OTHER PUBLICATIONS

International Search Report and Written Opinion, dated May 2, 2018, received in international patent application No. PCT/US2018/016209, 12 pages.

*Primary Examiner* — Kevin Verbrugge
(74) *Attorney, Agent, or Firm* — John W. Powell; Robert L. Hover; Verrill Dana, LLP

(57) ABSTRACT

Provided herein are controlled access data storage systems including a plurality of data storage units housed in a support enclosure; a port multiplier for providing data access to the plurality of data storage units; and a power control module for providing programmatic activation of one or more of the plurality of data storage units according to a time-based schedule, wherein the programmatic activation schedule operates independently of data transfer operations accessing one or more of the plurality of data storage units.

18 Claims, 10 Drawing Sheets

(56) References Cited

U.S. PATENT DOCUMENTS

| | | | |
|---|---|---|---|
| 2006/0129761 A1* | 6/2006 | Guha | G06F 1/3221 |
| | | | 711/114 |
| 2007/0079156 A1* | 4/2007 | Fujimoto | G06F 1/3221 |
| | | | 713/300 |
| 2008/0010234 A1* | 1/2008 | Nakagawa | G06F 1/3221 |
| 2008/0104339 A1* | 5/2008 | Nakagawa | G06F 3/0625 |
| | | | 711/154 |
| 2008/0104431 A1* | 5/2008 | Shimada | G06F 1/3221 |
| | | | 713/300 |
| 2009/0055520 A1* | 2/2009 | Tabata | G06F 1/3221 |
| | | | 709/223 |
| 2009/0083558 A1* | 3/2009 | Sugiki | G06F 1/3203 |
| | | | 713/320 |
| 2009/0292889 A1* | 11/2009 | Durfee | G06F 11/1456 |
| | | | 711/162 |
| 2010/0057991 A1* | 3/2010 | Yoshida | G06F 1/3221 |
| | | | 711/114 |
| 2010/0058322 A1* | 3/2010 | Oikawa | G06F 8/65 |
| | | | 717/173 |
| 2010/0115305 A1* | 5/2010 | Ichikawa | G06F 1/3203 |
| | | | 713/320 |
| 2014/0047261 A1* | 2/2014 | Patiejunas | G06F 1/266 |
| | | | 713/330 |
| 2014/0317444 A1* | 10/2014 | Kushihara | G06F 3/0653 |
| | | | 714/6.22 |
| 2015/0089221 A1 | 3/2015 | Taylor et al. | |
| 2017/0083472 A1* | 3/2017 | Su | G06F 13/4045 |

* cited by examiner

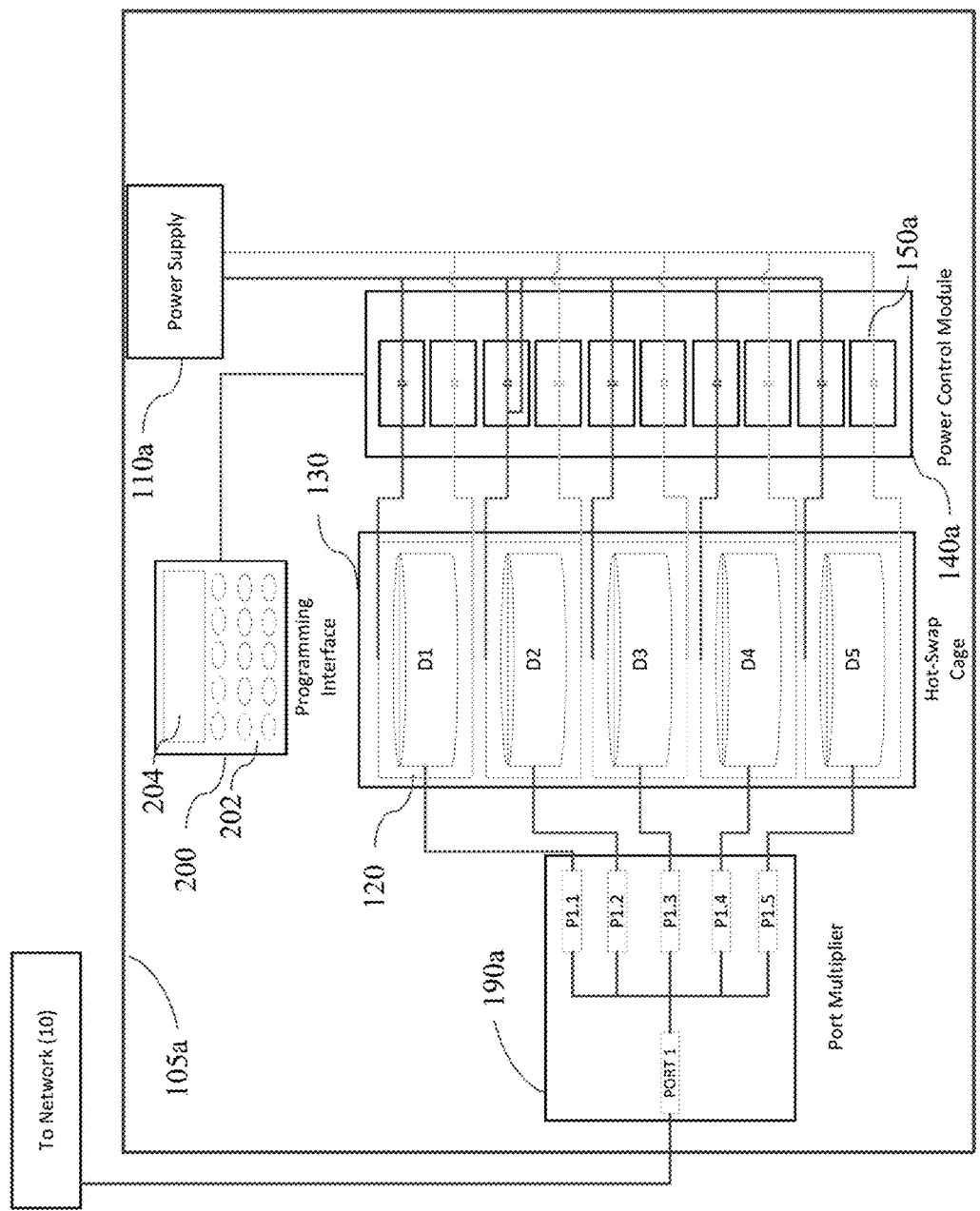

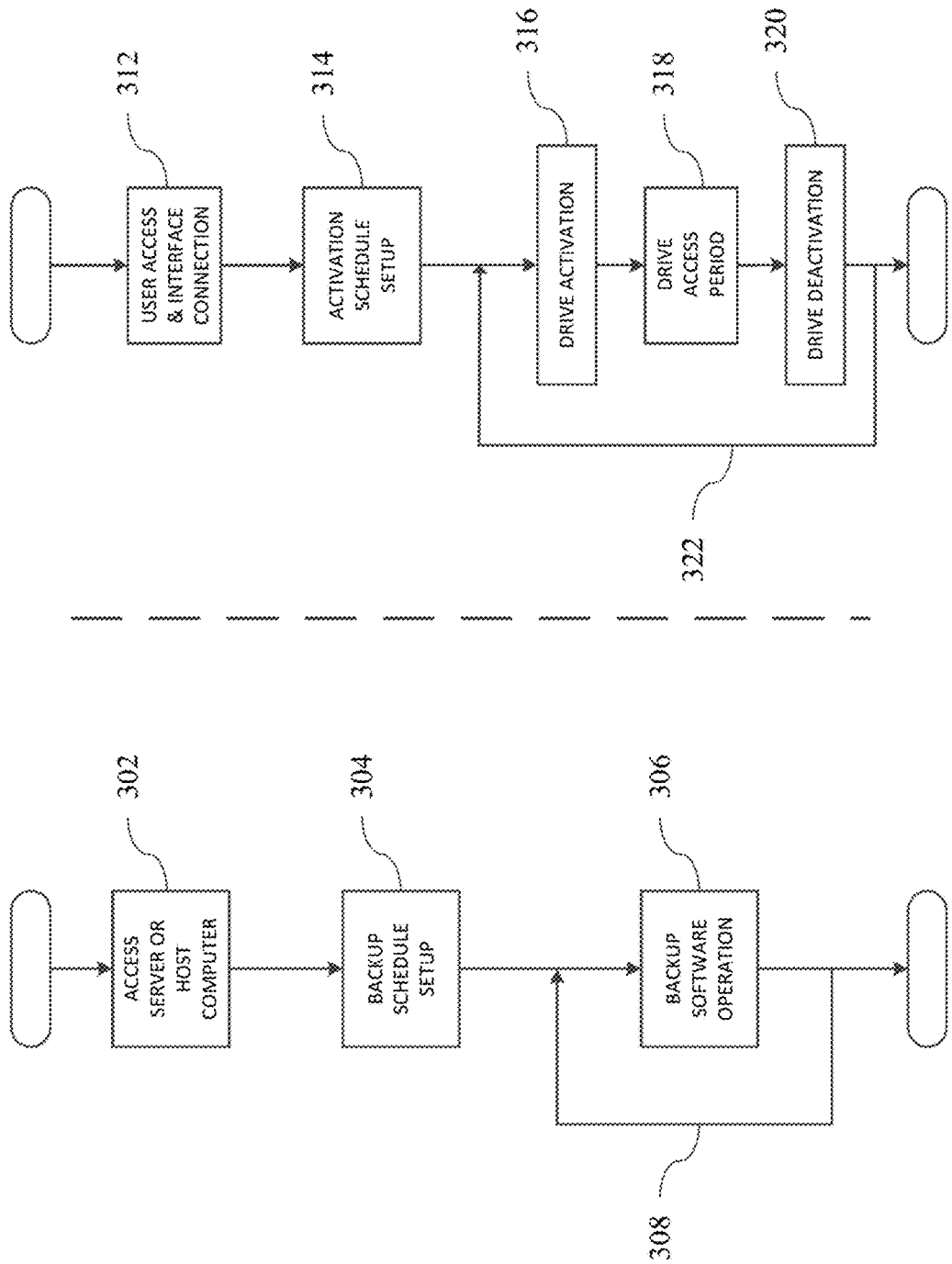

CONTROLLED ACCESS TO STORAGE

CROSS-REFERENCE TO RELATED APPLICATION

This Application claims the benefit of U.S. Provisional Application No. 62/452,748, filed Jan. 31, 2017.

FIELD OF THE INVENTION

The invention described herein relates generally to the field of networked computer backup storage. More specifically, the present invention provides controlled access to networked computer backup storage with manual control over access to individual storage units for limiting exposure to malicious code from infecting backup storage units during periods of nonuse.

BACKGROUND OF THE INVENTION

The increasing use of malicious computer codes to infect computers severely disrupts the vital operations of U.S. businesses large and small. A particularly disruptive strain of malicious codes encrypts user files unwittingly then requires payment of ransom fees to unlock files stored on network servers. Businesses either pay up or risk losing access to the files forever. Being denied immediate access to critical information, such as patient data in a medical care environment, can cause serious harm to both the organization and to the customer-patient. Likewise, industrial network operations running hazardous equipment puts employees and customers alike at risk of harm.

Companies store all manner of critical and proprietary business information on computer networks and rely on ready access in daily operations. When a company is denied access by malicious attack the operations of the business grind to a halt. Computer viruses that attack and encrypt computer storage necessarily have full access to the information stored thereon, including the private information of its employees and customers. Breaches of computer networks thus expose the company to liability for the loss of personally identifying information. Civil liability and new regulatory requirements for safeguarding private information puts a legal and reputational strain on the businesses.

Cloud computing, the storage of information in third-party networks via the Internet, offers no relief. Notorious breaches of cloud storage networks advertised as "secure" leave no storage means untouched by hackers, with dire and costly consequences to the company involved. Storage on local network servers offers some control over access by external hackers, but only so far as the storage in inaccessible to the internet. Storage on local networks offers little to no protection from internal hackers to local networks. Often, breaches of network security occur inadvertently by users failing to heed the warnings of network administrators to avoid opening emails and such on local computers. When such breaches occur, network administrators often rely on backup storage to recover lost files to previous versions of the files and to historical data settings according to daily, weekly, or monthly backup schedules. The loss of subsequent data and the exposure of the backup storage system itself to malicious code make this solution unpalatable.

The most secure computer storage system is one with no access to or from its host computer or network, which is, of course, of little utility in a networked information system. Some access must be provided and therefore exposure to some level of malicious code risk is inevitable. Efforts to limit the impact on data loss by sequestering ever more frequent backup storage, moving data offsite or offline, increases operational and capital costs to small and medium sized businesses who can least afford it.

Complicated prior art schemes and systems to safeguard backup storage systems or continuously monitor networked computer storage systems are expensive to staff and maintain, and prove unsatisfactory in practice. For example, international patent application publication WO 2014/111920 discloses a data storage system that switches power to a hard drive under the control of a processor using continuous monitoring of data transfers for suspect data patterns. Power to the hard drive is removed when a suspicious pattern is sensed in the data, but otherwise leaves the hard drive exposed at all times to the host computer, and requires that the sensors recognize ever-changing patterns of malicious software.

U.S. Pat. No. 7,346,790 discloses a method of cycling the power of a data storage system according to a schedule under the control of a host computer. However, the method creates no barrier to access by the host computer leaving the storage system exposed to malicious attacks on the host computer itself.

U.S. Pat. No. 8,015,420 discloses a data storage system providing remote control of the power supply to the storage enclosure. The enclosure includes a power supply module capable of remote wake-up by the host computer or network server. As such, the method creates no barrier to access by a virus infected remote system leaving the data storage system exposed to malicious attacks.

BRIEF SUMMARY OF THE INVENTION

Data storage systems are provided herein for physically secured, independently controlled, time-limited access to backup storage for the safeguarding of critical data.

In some embodiments, a controlled access data storage system is provided. The system includes a plurality of data storage units housed in a support enclosure. The system also includes a port multiplier for providing data access to the plurality of data storage units. The system also includes a power control module for providing programmatic activation of one or more of the plurality of data storage units according to a time-based schedule, wherein the programmatic activation schedule operates independently of data transfer operations accessing one or more of the plurality of data storage units.

In some embodiments, the programmatic activation schedule is configurable only by authorized access through a programming interface or external programming device in communication with the power control module. In some embodiments, the support enclosure is a hot swap cage. In some embodiments, the hot swap cage provides power supply to individual data storage units individually controllable by the power control module. In some embodiments, the power supply to each of the plurality of data storage units is comprised of one or more power supply voltages supplying all or partial power needs of the data storage units. In some embodiments, the plurality of data storage units are selected from the group comprising magnetic and optical drives, flash drives, thumb drives, and static random-access memory drives. In some embodiments, at least one of the programming interface or the external programming device is configured to define and initiate the programmatic activation schedule, wherein the programming interface or external programming device is accessible only to authorized users in physical proximity to the data storage system.

In some embodiments, the data storage system is housed in a self-contained enclosure. In some embodiments, the data storage system resides on a printed circuit board. In some embodiments, the system also includes a manual override module for manual activation of one or more of the plurality of data storage units. In some embodiments, the manual override module is controllable by the programming interface to independently manually activate one or more of the data storage units. In some embodiments, the manual override module further comprises one or more push button switches to independently manually activate one or more of the data storage units.

In some embodiments, a method is provided for providing controlled access to a data storage system. The method includes accessing, by an authorized user, at least one of a programming interface or an external programming device in communication with a power control module of a data storage system. The method also includes instructing, by the programming interface or external programming device, the power control module to execute a programmatic activation schedule for independently activating one or more data storage units of the data storage system, the programmatic activation schedule correlating to a data transfer operation associated with an external device or network in electronic communication with the data storage system. The method also includes activating, by the programmatic activation schedule, at least one of the data storage units during the data transfer operation.

In some embodiments, the method also includes configuring one or more data storage units in a support enclosure. In some embodiments, the step of configuring also includes installing one or more of the data storage units in the support enclosure. In some embodiments, the step of configuring also includes activating a power supply for powering the one or more installed data storage units. In some embodiments, the step of configuring also includes initializing the one or more data storage units for data transfer access through port multiplier. In some embodiments, the step of configuring also includes deactivating the one or more data storage units. In some embodiments, the programmatic activation schedule is configurable only by physical access by the authorized user through a programming interface device directly connected to the power control module or by physical user access to the manual override module. In some embodiments, the data transfer operation external the data storage system is a data backup operation. In some embodiments, the data transfer operation external the data storage system is a data recovery operation. In some embodiments, activation of the one or more data storage units for access by the external data transfer operation is by manual override of the programmatic activation schedule. In some embodiments, activation of the one or more data storage units for access by the external data transfer operation is by manual override of the programmatic activation schedule.

The above and other benefits and advantages of the present invention will be readily apparent from the Figures and Detailed Description to follow.

One skilled in the art will appreciate that the present teachings can be practiced with embodiments other than those summarized or disclosed below by the Figures and Detailed Description of the Invention to follow.

BRIEF DESCRIPTION OF THE DRAWINGS

Embodiments of the present invention will now be described, by way of example only, with reference to the attached Figures, wherein:

FIG. 2C shows a dual function programming interface embodiment of the data storage system of the present invention.

FIGS. 3A and 3B illustrate independent setup of the backup software and programmatic activation schedule and backup operation according to one aspect of the invention.

DETAILED DESCRIPTION

The present invention will now be described more fully herein with reference to exemplary embodiments, examples of which are illustrated in the accompanying drawings. Embodiments and implementations set forth in the following detailed description do not represent all embodiments and implementations of the claimed invention.

Generally, the present invention provides for a multiple hard drive data storage system, such as may be used to backup computers and networks, secure from intrusion by remote, electronic means by controlling access to activation of the individual storage units of the data storage system. Activation of the individual storage units can be limited to times and instances of necessary usage as determined by the user or system administrator having physical access to the data storage system. In accordance with various embodiments, the means for activation of the individual storage units of the data storage system is inaccessible to users and would-be hackers other than by physical proximity and by direct electrical connection to a power control module housed within the data storage subsystem. Additionally, programming and manual operation of the activation schedule for the individual storage units is independent of external controls or systems, such as backup software associated with external networks or devices connected to the data storage system.

In accordance with various embodiments, data storage system may be self-contained or "stand-alone," in its own enclosure with its own power supply or, without loss of generality, data storage system may be a subsystem within a host system and may be powered by such host system's internal power supply, or may be powered by a power supply external to the host computer system or data storage system. Preferably, access to the data storage system enclosure and/or host computer is physically limited by its installation in a locked cabinet or room or other physically secured area of a data network support facility. Physical access to the data storage system is provided to authorized users and system administrators, designated network personnel and the like and may be further secured by electronic locks and security measures.

Figure 1:
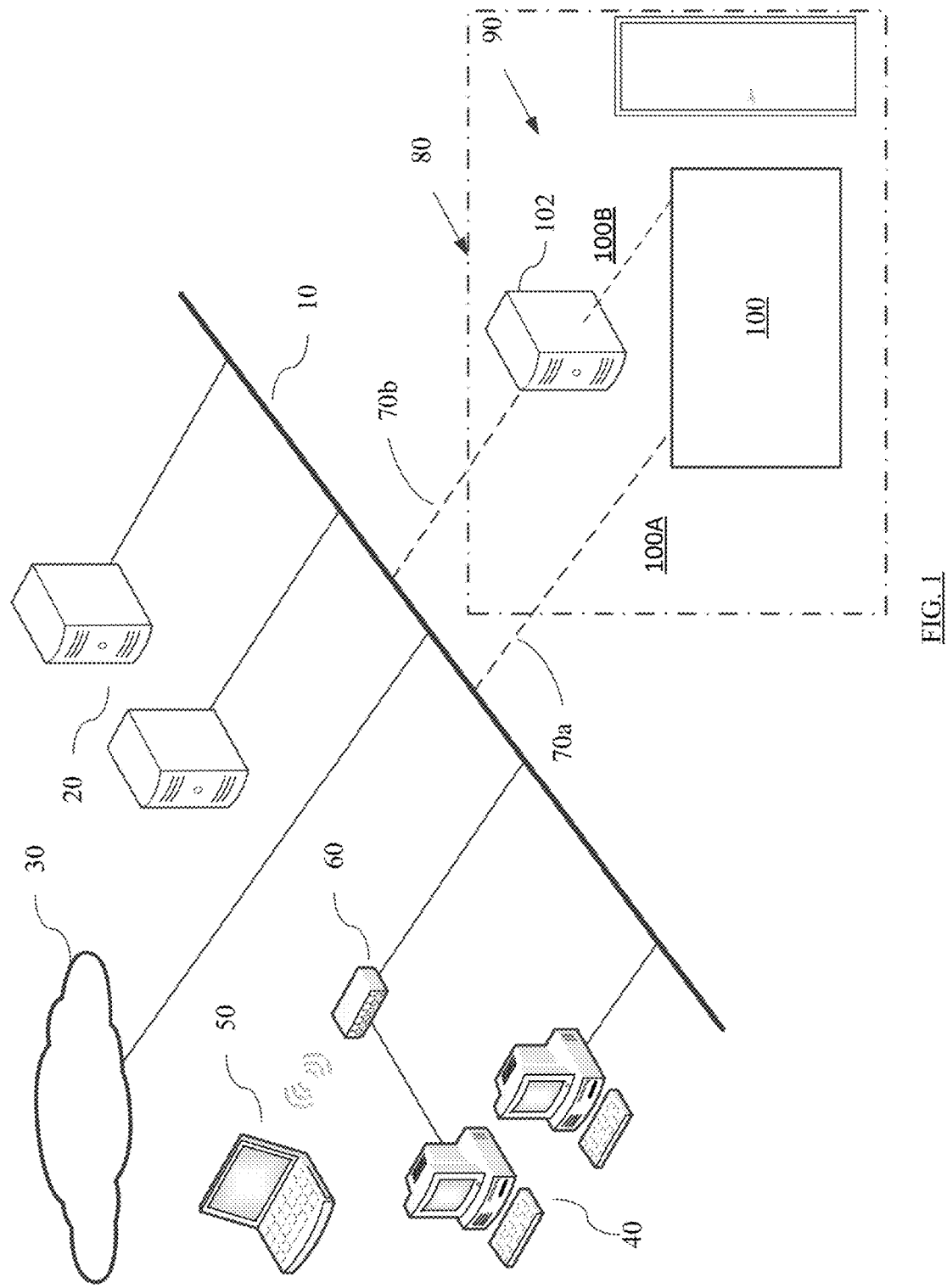
FIG. 1 provides an overview of the controlled access data storage system in the context of a networked computer information system and further depicting two alternative embodiments.

FIG. 1 depicts, generally, the data storage system 100 for use in a networked computer information system. Network 10 may connect one or more network servers 20, which may be further connected to other networks, including local area networks and/or the internet 30. One or more networked computers 40 or laptop computers 50 may be directly connected to network 10 or may be connected through switches and/or routers, as shown, hub 60, which may provide wired or wireless access to network 10. Data storage system 100 may be connected directly to network 10 by wired or wireless access 70a or to network 10 by wired or wireless access 70b of host computer 102. Thus, as depicted in FIG. 1, data storage system 100A may connect to and be accessible from servers, personal computers, network nodes, such as routers and switches, or other network-enabled devices. In an alternative embodiment further described below, data storage system 100B may connect and be accessible to network 10 from within host computer 112 with host computer 112 providing access to network 10.

In some embodiments, the data storage system 100 can be used to back up data stored on one or more nodes of the network 10 (e.g., network servers 20, internet 30, computers 40, laptops 50, and hub 60). However, to prevent contamination or breach of the data stored on the data storage system 100, components of the data storage system 100 should generally be powered off (deactivated) unless currently required for a particular data transfer operation. Additionally, in order to prevent inappropriate or malicious activation of one or more components via, for example, a contaminated or compromised node of the network 10, the activation schedule should be physically secured, time-limited, and controlled independently from the backup system.

Figure 2:
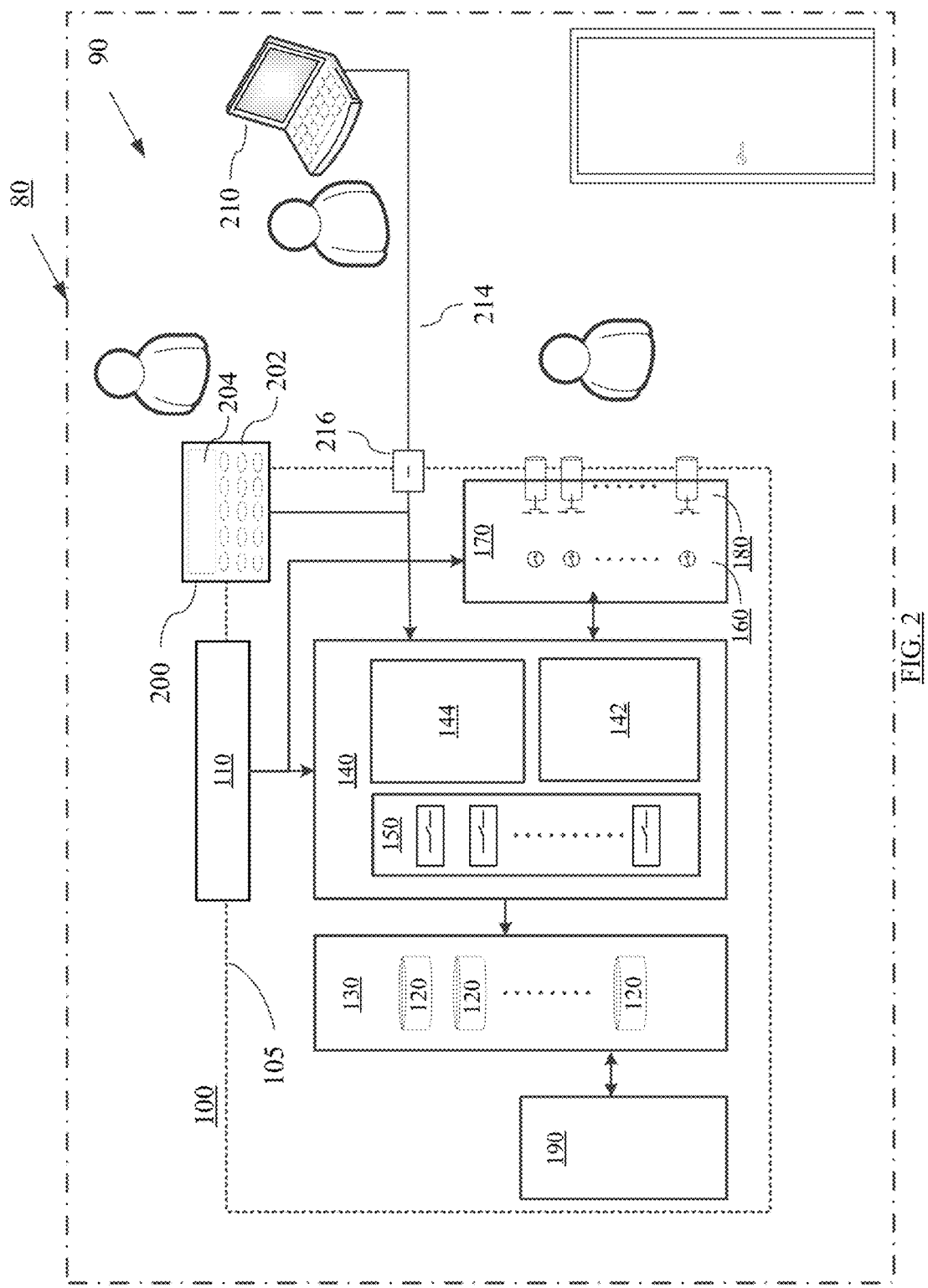
FIG. 2 depicts the basic structure and user access for programming and manual activation of the controlled access data storage system according to one aspect of the invention.

FIG. 2 depicts components of an embodiment of the data storage system and its access by authorized users for the programming and/or manual activation of the controlled access data storage system according to one aspect of the invention. Data storage system 100 in alternative embodiments 100A and 100B provide self-contained and host computer embodiments, respectively, as depicted in FIG. 1 and further described in reference to FIGS. 2A and 2B below. Access to data storage system 100 may be physically limited by locating the data storage system within a room 80 or other area secure area 90 for access by authorized persons only. Secured facilities 80 or 90 may include a locked closet or locked rack mount enclosure (not shown) and may include multiple controlled access data storage systems.

In embodiments depicted generally as in FIG. 2, data storage system 100 is comprised of a power supply 110, which may be internal or external to the data storage system. Power supply 110 may be any power supply capable of supplying appropriate voltage and current requirements of components of the data storage system, including, but not limited to switching power supply devices commonly used to convert AC power input to DC power outputs suitable for driving hard drives, processors, network controllers, media controllers and indicators including LED indicators.

Data storage system 100 further comprises one or more hard drives 120. Hard drives 120 may include any number of hard drives corresponding to requirements of the data storage system, such as a defined network data backup plan or other data archival needs according to a weekday, weekly, monthly or arbitrary backup schedule. It is noted that the terms "data storage unit" or "hard drive" and "hard disk," which may be used interchangeably herein, refer to any data storage system device, including magnetic and optical drives, flash drives, thumb drives, static random-access memory (RAM) drives, and the like, internal or external to the data storage system or host computer system. Hard drives may be of any capacity and without limitation be of the same or mixed capacity or of a mixed type of data storage device. Some or all of the hard drives in the data storage system according to the present invention may be enabled for controlled access and some may not be enabled for controlled access but still be accessible for data storage within the data storage system. For redundancy and off-line storage, hard drives may be easily removed and/or replaced from a secured enclosure via "hot swap" connectors for storage or transport offsite. Hard drives may be physically marked or identified according to usage in the application of the data storage system and may include activity lights on the hard drives or installed drive bays.

As shown in FIG. 2, hard drives 120 may be installed in a support structure 130 comprising support hardware and "hot swap" power supply slots to receive one or more hard drives. The hard drive support structure may be referred to in some embodiments as a "hot swap cage," which provides an enclosure for one or more hard drives that may allow storage media to slide in and out, locking into place, and may provide "hot" swapping of hard drives during powered operation. Hot swap cage 130 may be configured to provide power to individual hard drives 120 or to sets of two or more hard drives, or to combinations of controlled access and uncontrolled access hard drives. Hot swap cage 130 may be modified or configured to allow separate control of the power supply to individual or sets of hard drives. An example of a commercially available hot swap cage suitable for modification or configuration as such is the iStarUSA™ BPU-350SATA-SILVER SAS/SATA 6.0 Gb/s Hot-Swap Cage.

Power control module 140 provides activation of individual hard drives 120. Preferably, power control module 140 activates individual hard drives by controlling one or more relays 150 to control power supply voltage and/or current supplied to hot swap cage 130 and thus the power supplied to hard drives 120. Relays 150 may control power supply voltage or current at one or two voltages, for example, +12 volts DC and +5 volts DC, or may control power supply voltage at multiple supply voltages, for example, +12 volts DC and +5 or 3.3 volts DC, comprising all or partial power requirements of the hard drives. Alternatively, power control module 140 may activate individual hard drives 120 using a multiplexed power control device (not shown). Multiplexed power control may control power supply voltages at +12 volts DC, +5 volts DC, or 3.3 volts DC or a combination of power supply output voltages, AC or DC, without departing from the scope of the invention. An example of a commercially available hard drive power switching device capable of configuration for use with the power control module 140 is the KINGWIN™ HDD-P56 Hard Drive Power Switch.

Returning to FIG. 2, each of the one or more relays 150 may be open or closed on a programmatic schedule under the control of power control module 140. Relays 150 may be activated on a timed or calendar based programmatic schedule, which may include times and/or schedule of one or more intervals of "on" times and/or "off" times according to the programmatic schedule. Execution of stored programs operating on a programmatic schedule stored in memory 142 may be provided by processor 144 to determine conditions for the activation and deactivation of hard drives 120. Processor 144 may further perform other automated tasks upon execution of stored programs provided in memory 142 without departing from the scope of the invention, including providing authentication of users accessing programming interface 200 or communications port 216. An example of a commercially available time-controlled relay device suitable for use or configuration for use in the present invention is the TLR165 USB Taralist™ Time Controlled Relay Time Activated Relay 16-Channel 5-Amp SPDT with USB Interface. Details of additional structure and operation of the power control module are provided below.

Data storage system 100 may further include manual override module 170. Manual override module 170 provides for manual activation of hard drives during periods of programmatic control by power control module 140. Manual override module 170 may include manually operated switches, which, in some embodiments, may be push button switches 180 configured as single-pole or double-pole switches to control one or two power supply voltages, or may be momentary switches communicating a change in state power control module 140. Manual override switches 180 may number one or more switches according the number of hard drives or sets of hard drives 120 available to power control module 140.

Manual override module 170 may further comprise drive activation indicators 160 for indicating the status of activation for individual or multiple hard drives under the control of power module 140. Indicators may be integral to manual activation switches 180 or may be provided in a module separate from manual override module 170. Drive activation indicators 160 may number one or more indicators according the number of hard drives or sets of hard drives 120 available to power control module 140. Other indicators for the activation of hard drives not under power module control or to indicate activity of other components of the controlled-access data storage system may be combined with drive activation indicators 160 without departing from the scope of the invention. Operation of manual override module 170 in conjunction with power control module 140 is further described below.

Additionally shown in FIG. 2 is port multiplier 190. Port multiplier 190 provides data transfer to and from network 10 to the data storage system 100. Port multiplier 190 distributes data transfers received from network 10 to hard drives 120 according to an addressable mapping of hard drives accessible to the host computer, network servers, computers, nodes, routers and switches, Port multiplier 190 transfers data from one or more hard drives 120 to the network devices by mapping data transfers to the network according to an addressable mapping. Any of one or multiple port multipliers capable of facilitating data transfer between network 10 and one or more hard drives 120 may be employed without departing from the scope of the invention. An example of a commercially available port multiplier device suitable for use in the present invention is the Addonics™ 5×1 Internal SATA Port Multiplier.

Also shown in FIG. 2, data storage system 100 may connect to external programming device 210 in communication with power control module 140. External programming device 210 may comprise a fixed or portable computer, laptop, smartphone, or other similar device capable of physical connection to power control module 140 through a communications cable 214 as previously described. Physical access by a person in close proximity to the data storage system is required to connect communications cable 214 to the power control module 140 through communications port 216 mounted on or provided external to the data storage system 100. Alternatively or additionally, the programmatic schedule for activation of the hard drives may be configured, set, changed, and initiated by a programming interface 200 in communication with power control module 140. Preferably, the programming interface provides a keypad and display to configure, set, change, and initiate the programmatic schedule for activation of the hard drives. Physical access by a person in close proximity to the data storage system host computer is required to operate the programming interface 200.

Self-Enclosed or Stand-Alone Embodiment

Figure 2A:
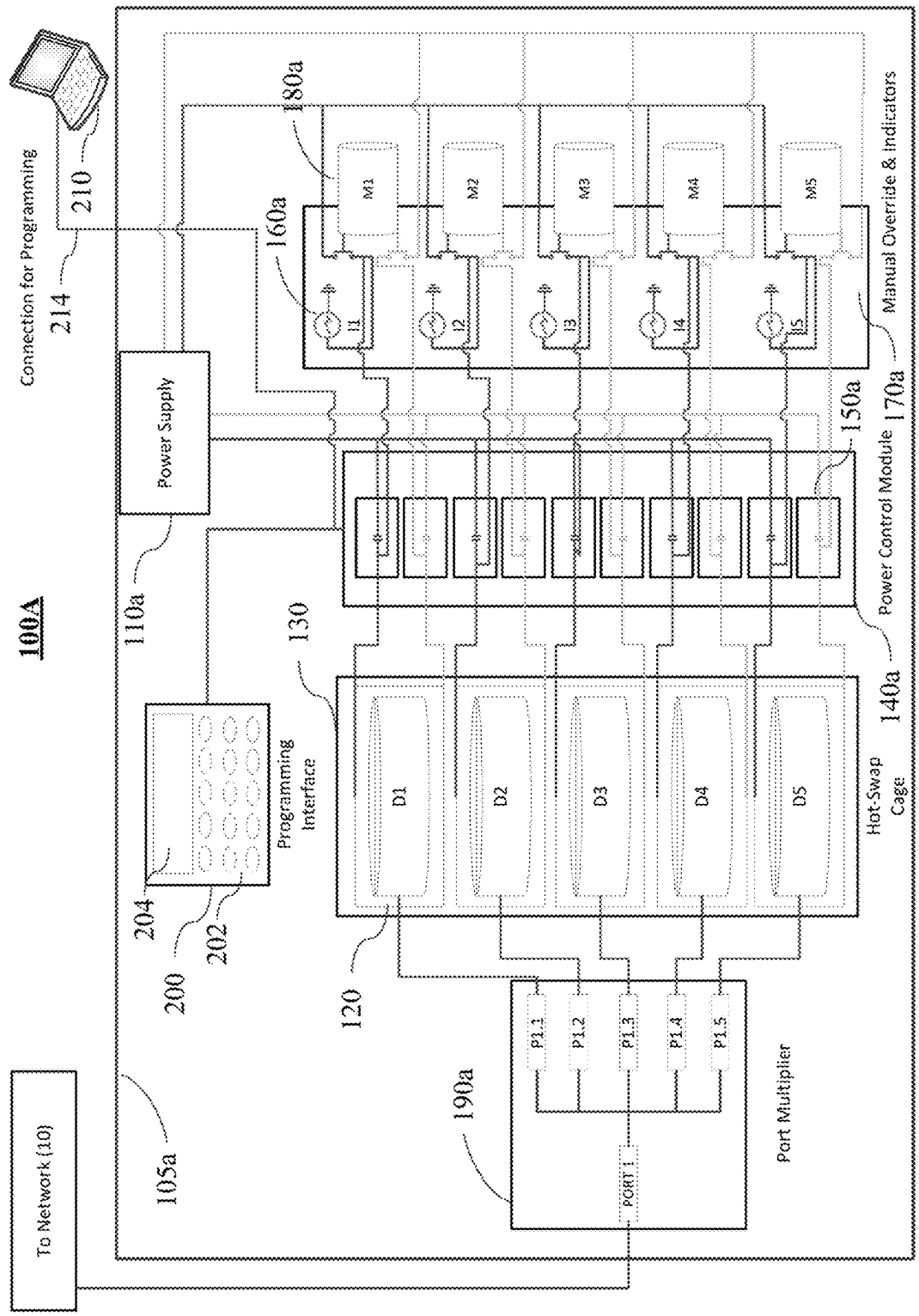
FIG. 2A shows a self-contained or "stand-alone" embodiment of the data storage system of the present invention.

FIG. 2A depicts data storage system 100 according to one embodiment of the invention. Data storage system 100A includes an internal power supply 110a. Power supply 110a is a power supply capable of supplying appropriate voltage and current requirements of components of the data storage system, such as a switching power supply commonly used to convert AC power input to DC power outputs suitable for driving hard drives, processors, network controllers, media controllers and indicators including LED indicators. Data storage system 100A further comprises one or more hard drives 120 (D1-D5). Hard drives 120 preferably number five (5) or seven (7) hard drives corresponding to requirements of the data storage system according to a weekday or weekly schedule.

As shown in FIG. 2A, hard drives 120 may be installed in a hot swap cage 130, which provides an enclosure for one or more hard drives that may allow storage media to slide in and out, locking into place, and may provide "hot" swapping of hard drives during powered operation. Hot swap cage 130 is configured to provide power to individual hard drives 120 or to sets of two or more hard drives, or to combinations of controlled access and uncontrolled access hard drives housed within the same data storage. Hot swap cage 130 is modified and configured to allow separate control of the power supply to individual or sets of hard drives. Power control module 140a provides activation of individual hard drives 120. Power control module 140a activates individual hard drives by controlling one or more relays 150a to control power supply voltage and/or current supplied to hot swap cage 130 and thus the power supplied to hard drives 120. Relays 150a may control power supply voltage or current at one or two voltages, for example, +12 volts DC and +5 volts DC, or may control power supply voltage at multiple supply voltages, for example, +12 volts DC and +5 or 3.3 volts DC, comprising all or partial power requirements of hard drives 120.

Each of the one or more relays 150a may be open or closed on a programmatic schedule under the control of power control module 140a. Relays 150a may be activated on a timed or calendar based programmatic schedule, which may include times and/or schedule of one or more intervals of "on" times and/or "off" times according to the programmatic schedule. Data storage system 100A further includes manual override module 170a. Manual override module 170a provides for manual activation of hard drives during periods of programmatic control by power control module 140a. Manual override module 170a may include manually operated switches, which, in some embodiments, may be push button switches 180a configured as single-pole or double-pole switches to control one or two power supply voltages, or may be momentary switches communicating a change in state power control module 140. Manual override switches 180 may number one or more switches according the number of hard drives or sets of hard drives 120 available to power control module 140.

Manual override module 170*a* may further comprise drive activation indicators 160*a* (I1-I5) for indicating the status of activation for individual or multiple hard drives under the control of power module 140*a*. Indicators may be integral to manual activation switches 180*a* or may be provided in a module separate from manual override module 170*a*. Drive activation indicators 160*a* may number one or more indicators according the number of hard drives or sets of hard drives 120 available to power control module 140*a*. Other indicators for the activation of hard drives not under power module control or to indicate activity of other components of the controlled-access data storage system may be combined with drive activation indicators 160*a* without departing from the scope of the invention. Operation of manual override module 170*a* in conjunction with power control module 140*a* is further described below.

Additionally shown in FIG. 2A is port multiplier 190*a*. Port multiplier 190*a* provides data transfers to and from network 10 to the data storage system 100A. Port multiplier 190*a* distributes data transfers received from network 10 to the one or more hard drives 120 according to an addressable mapping of hard drives accessible to the host computer, network servers, computers, nodes, routers and switches, Port multiplier 190*a* transfers data from one or more hard drives 120 to the network devices by mapping data transfers to the network according to an addressable mapping.

Also shown in FIG. 2A, data storage system 100A may connect to external programming device 210 in communication with power control module 140*a*. External programming device 210 may comprise a fixed or portable computer, laptop, smartphone, or other similar device capable of physical connection to power control module 140*a* through a communications cable 214 as previously described. Physical access by a person in close proximity to the data storage system is required to connect communications cable 214 to the power control module 140*a* through communications port 216 mounted on or provided external to the data storage system 100. Alternatively or additionally, the programmatic schedule for activation of the hard drives may be configured, set, changed, and initiated by a programming interface 200 in communication with power control module 140*a*. Preferably, the programming interface provides a keypad and display to configure, set, change, and initiate the programmatic schedule for activation of the hard drives. Physical access by a person in close proximity to the data storage system host computer is required to operate the programming interface 200.

Integrated Electronics Printed Circuit Board Embodiment

Figure 2B:
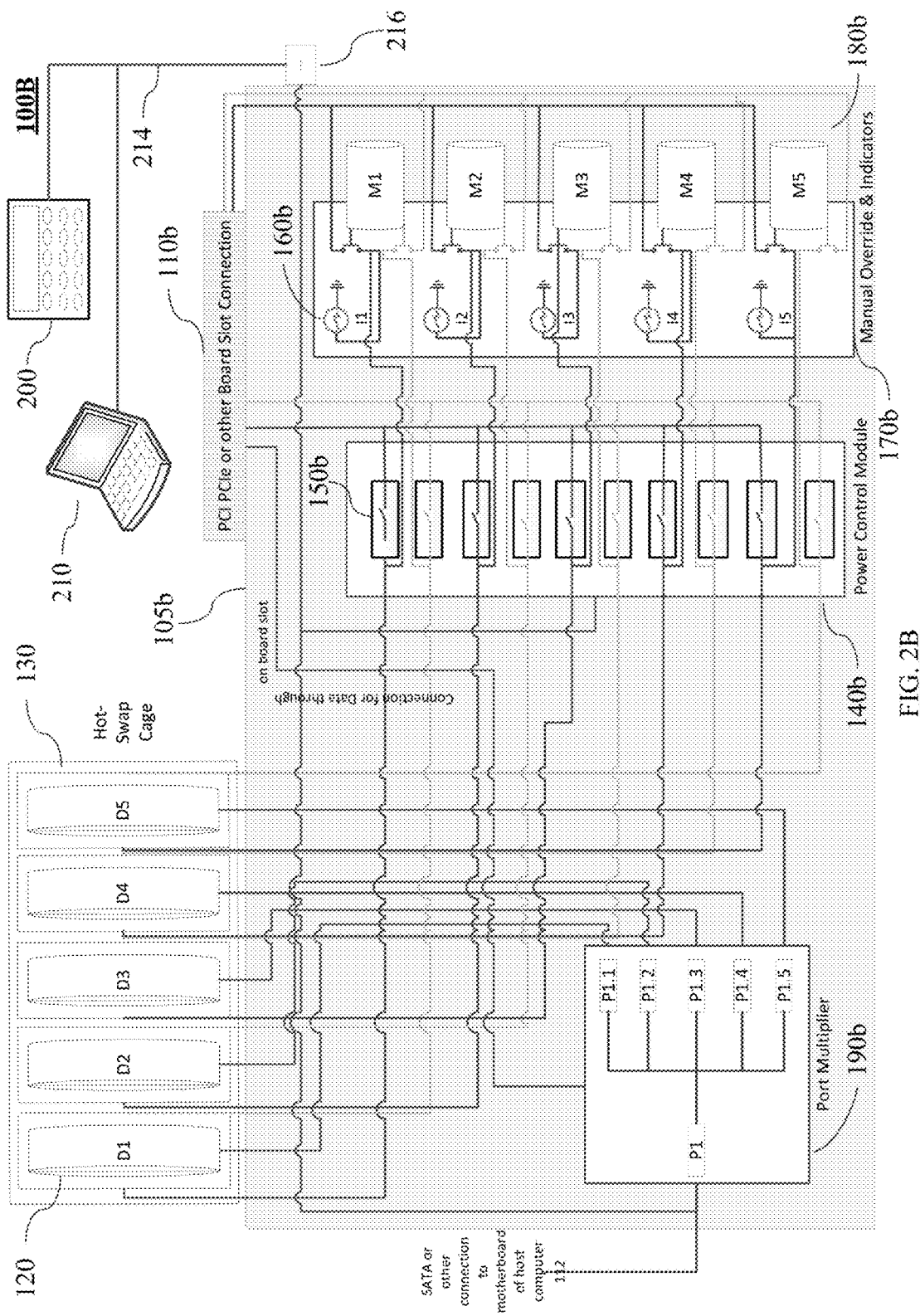
FIG. 2B shows an alternative printed circuit board or "host computer" embodiment of the data storage system of the present invention.

FIG. 2B shows an alternative embodiment 100B of the data storage system 100 previously described. Here components of data storage system 100B reside substantially on printed circuit board (PCB) 105*b*. Printed circuit board 105*b* of data storage system 100B comprises port multiplier 190*b*, power control module 140*b*, and manual override module 170*b* integrated on a peripheral component interconnect (PCI) or PCI extended (PCIe) device for installation in a host computer (not shown) or rack mounted chassis (not shown) providing PCI/PCIe standard bus architecture. Alternatively, printed circuit board 105*b* may be installed in an available slot of a compatible industry standard architecture (ISA) bus or may be interconnected to a host computer via multi-pin connector or cable without departing from the scope of the invention. Components of the PCB may be modular in design, with discrete modules integrated by electrical connections or fully integrated as one design without loss of generality. Standard bus architecture provides power supply to the PCB through connection to the bus of the host computer.

As shown in FIG. 2B, data storage system 100B may further comprise one or more hard drives 120 housed in hot swap cage 130. Hard drives 120 preferably number five (5) or seven (7) hard drives corresponding to requirements of the data storage system according to a weekday or weekly schedule. Hot swap cage 130 provides an enclosure or support structure for one or more hard drives that may allow storage media to slide in and out, locking into place, and may provide "live" swapping of hard drives during powered operation. Hot swap cage 130 may be configured to provide power to individual hard drives 120 (D1-D5) or to sets of two or more hard drives, or to combinations of controlled access and uncontrolled access hard drives housed within the same data storage. Hot swap cage 130 may be modified or configured to allow separate control of the power supply to individual or sets of hard drives.

Power control module 140*b* of FIG. 2B provides activation of individual hard drives 120. Preferably, power control module 140*b* activates individual hard drives by controlling one or more relays 150*b* that control power supply voltage and/or current supplied to hot swap cage 130. Power may be provided through board slot connection 110*b* or may be separately provided to the printed circuit board. Relays 150*b* may control power supply voltage or current at one or two voltages, for example, +12 volts DC and +5 volts DC, or may control power supply voltage at multiple supply voltages, for example, +12 volts DC and +5 or 3.3 volts DC, comprising all or partial power to the hard drives. Alternatively, power control module 140*b* may activate individual hard drives using a multiplexed power control device (not shown). Multiplexed power control may control power supply voltages at +12 volts DC, +5 or 3.3 volts DC, or a combination of power supply voltages, without departing from the scope of the invention. Relays 150*b* or multiplexed power control may be controlled on a time- or calendar-based schedule, which may include times and/or schedules having one or more intervals of "on" times and/or "off" times according to a programmatic schedule.

Drive activation indicators 160*b* indicate the status of activation for individual or multiple hard drives under the control of power module 140*b* programmatic schedule or manual power control override 170*b*. Indicators for operation and activation of hard drives or other components of the controlled-access data storage system may be combined with drive active indicators 160*b* without departing from the scope of the invention. Drive activation indicators 160*b* may reside on the PCB or be provided by a drive activation indicator module (not shown) mounted separately on the host computer enclosure. Indicators may be integral to switches 160*b*, which may be separately mounted on the PCB or on a separate drive activation indicator module (not shown). Manual switches 180*b*, in some embodiments, may be push button switches configured as single-pole or dual-pole switching one or two power supply voltages, or may be momentary switches communicating a change in state power control module 140*b*. Drive active indicators 160*b* and switches 180*b* may number one or more indicators or switches according the number of hard drives or sets of hard drives 120 available to power control module 140*b*.

Port multiplier 190*b* provides data transfer to and from the host computer (not shown) to the data storage system 100*b* through connection to the motherboard or by other connection. The host computer may in turn connect to servers, personal computers, network nodes, such as routers and switches, or other network-enabled devices (see, e.g., FIG. 1). Port multiplier 190b distributes data transfers received from the host computer to one or more hard drives 120 according to an addressable mapping of hard drives accessible to the host. Port multiplier 190b transfers data from one or more hard drives 120 to the host computer or network via connection on the host computer bus or through direct connection to the network by Ethernet or other data communications connector and/or protocol. Port multiplier 190b maps data transfers to the host computer or network according to an addressable mapping. Any of one or multiple port multipliers capable of facilitating data transfer may be employed without departing from the scope of the invention.

Returning to power control module 140b of FIG. 2B, each of one or more hard drives 120 housed in hot swap cage 130 may be activated on a programmatic schedule under the control of the power control module. Alternatively, and/or additionally, activation of hard drives may be provided by manual override module 170b. In each instance, physical proximity to data storage system 100b is required to schedule or manually activate the hard drives. Physical access by a person in close proximity to the data storage system is required to configure, set, change, and initiate the programmatic schedule for activation of the hard drives. Physical access by a person in close proximity to the data storage system is required to manually activate (or deactivate) the hard drives. Absent physical access in proximity to the controlled-access data storage system, the programmatic activation schedule or manual activation of individual or multiple hard drives is unavailable.

As shown in FIG. 2B, data storage system 100B may provide external programming device 210 in communication with power control module 140b. External programming device 210 may comprise a fixed or portable computer, laptop, smartphone, or other similar device capable of physical connection to power control module 140b through a communications cable 214 as previously described. Physical access by a person in close proximity to the data storage system is required to connect communications cable 214 to the power control module 140b through communications port 216 mounted on or provided external to printed circuit board 105b. Alternatively or additionally, the programmatic schedule for activation of the hard drives may be configured, set, changed, and initiated by a programming interface 200 in communication with power control module 140b. Preferably, the programming interface provides a keypad and display to permit the user to configure, set, change, and initiate the programmatic schedule for activation of the hard drives. Physical access by a person in close proximity to the data storage system host computer is required to operate the programming interface 200.

Dual Function Programming Interface Embodiment

FIG. 2C depicts data storage system 100 according to one embodiment of the invention. Data storage system 100C comprises an internal power supply 110c. Power supply 110c is a power supply capable of supplying appropriate voltage and current requirements of components of the data storage system, such as a switching power supply commonly used to convert AC power input to DC power outputs suitable for driving hard drives, processors, network controllers, media controllers and indicators including LED indicators. Data storage system 100C further comprises one or more hard drives 120 (D1-D5). Hard drives 120 preferably number five (5) or seven (7) hard drives corresponding to requirements of the data storage system according to a weekday or weekly schedule.

As shown in FIG. 2C, hard drives 120 may be installed in a hot swap cage 130, which provides an enclosure for one or more hard drives that may allow storage media to slide in and out, locking into place, and may provide "hot" swapping of hard drives during powered operation. Hot swap cage 130 is configured to provide power to individual hard drives 120 or to sets of two or more hard drives, or to combinations of controlled access and uncontrolled access hard drives housed within the same data storage. Hot swap cage 130 is modified and configured to allow separate control of the power supply to individual or sets of hard drives. Power control module 140c provides activation of individual hard drives 120. Power control module 140c activates individual hard drives by controlling one or more relays 150c to control power supply voltage and/or current supplied to hot swap cage 130 and thus the power supplied to hard drives 120. Relays 150c may control power supply voltage or current at one or two voltages, for example, +12 volts DC and +5 volts DC, or may control power supply voltage at multiple supply voltages, for example, +12 volts DC and +5 or 3.3 volts DC, comprising all or partial power requirements of hard drives 120.

Each of the one or more relays 150c may be open or closed on a programmatic schedule under the control of power control module 140c. Relays 150c may be activated on a timed or calendar based programmatic schedule, which may include times and/or schedule of one or more intervals of "on" times and/or "off" times according to the programmatic schedule.

Additionally shown in FIG. 2C is port multiplier 190c. Port multiplier 190c provides data transfers to and from network 10 to the data storage system 100A. Port multiplier 190c distributes data transfers received from network 10 to the one or more hard drives 120 according to an addressable mapping of hard drives accessible to the host computer, network servers, computers, nodes, routers and switches, Port multiplier 190c transfers data from one or more hard drives 120 to the network devices by mapping data transfers to the network according to an addressable mapping.

Also shown in FIG. 2C, data storage system 100C may connect to a programming interface 200 in communication with power control module 140c. In some embodiments, the programming interface 200 can be installed within, positioned on, or positioned proximate to the hot swap cage 130 in order to require physical access by a person in close proximity to the data storage system 100C for operation. The user can then provide manual or programmatic instruction to the data storage system 100C. In general, the programmatic schedule for activation of the hard drives may be configured, set, changed, and initiated by the programming interface 200 in communication with power control module 140c. Preferably, the programming interface 200 provides a keypad and display to configure, set, change, and initiate the programmatic schedule for activation of the hard drives. Physical access by a person in close proximity to the data storage system host computer is required to operate the programming interface 200.

In such embodiments, the programming interface 200 can be configured to execute a preprogrammed activation schedule and to further provide a secondary manual override function by permitting the user to override the preprogrammed schedule. In such embodiments the user can manually enter instructions for the programming interface 200 to operate the power control module 140c to activate or deactivate one or more of the hard drives 120. Such manual control provides the user with an ability to, for example, terminated the activation program in the event that contaminated data is detected on one or more drives to be backed up.

In each embodiment described herein, physical proximity to data storage system 100 is required to programmatically schedule or manually activate or deactivate hard drives 120. Physical access by a person in close proximity to the data storage system is required to configure, set, change, and initiate the programmatic schedule for activation of the hard drives. Physical access by a person in close proximity to the data storage system is required to manually activate (or deactivate) the hard drives. Absent physical access in proximity to the controlled-access data storage system, the programmatic activation schedule or manual activation of individual or multiple hard drives is unavailable. User access to and programming of the power control module to activate hard drives according to a programmatic schedule, or to activate hard drives by manual override is now described.

User Access and Programmatic or Manual Activation

As previously described and with reference to FIGS. 1 and 2, generally, the controlled-access data storage system provides secure, timed-access to hard drives by activating and deactivating the power supplied to individual hard drives according to a programmatic schedule. For security, all unscheduled drives in the unit are placed electronically offline by the device and completely inaccessible to the network or the host computer system. As such, the data storage system maintains a data "airlock" to protect proprietary, confidential, business-critical information during times of non-use of the data storage system.

FIG. 2 depicts user access to and programming of the controlled-access data storage system of the present invention. A user or system administrator or other authorized personnel must first obtain access to the secure location 80 or area 90 data storage system 100 enclosure or host computer. User may connect external programming device 210 to the communications port 216 of power control module 140. Programming device 210 may provide users with text-based or graphical interface controls for configuring a programmatic schedule for activation of hard drives 120 according to the requirements for data storage access by the host computer or networked computers, servers, or other networked nodes or computers. Interface controls may provide for the selection and configuration of a USB port, a serial communications port at a particular port and baud rate, or a direct Ethernet connection specifying a local IP address and port accessible only by communications port of the power control module 140. Users may alternatively access the power control module via programming interface 200 providing similar controls for configuring the programmatic schedule of hard drive activations. Programming interface 200 may receive from the user commands to configure, set, initiate and/or change a default programmatic schedule of operation. Programmatic schedule may execute immediately on initiation of the program by a user or begin and/or end at a prescribed interval or time or future date.

Physical access by a person in proximity to the data storage system is required to operate the programming interface or connect the external programming device. External programming device 210 may comprise a fixed or portable computer, laptop, smartphone, or other similar device capable of physical connection to power control module 140 through a communications cable 214 such as Universal Serial Bus (USB), serial communications port, firewire, Ethernet, or the like. Physical access by a person in close proximity to the data storage system is required to connect communications cable 214 to the power control module. Connection to power control module 140 may be direct or through communications port 216. Alternatively or additionally, data storage system 100 may provide programming interface 200 in communication with power control module 140. Preferably, programming interface 200 provides keypad 202 and display 204 to configure, set, change, and initiate the programmatic schedule for activation of the hard drives.

Commands to program the power control module may include menu-based commands or a selection of commands or setting of the programmatic schedule by displaying a calendar and indications of times when one or more hard drives may be activated or deactivated by the power control module. Consistent with the requirements of the backup schedule, destination and volume of source data, the programmatic schedule may be configured to activate one or more hard drives during the expected period required for backup of the source data onto the destination drive(s). The operation of the data storage system will now be described with reference to its application to backup storage and recovery of business-critical data. Such a description of the application described below is for illustration purposes only and not limiting to the use of the invention and its inherent benefits to secure data storage in other applications and operations.

Example Backup Operation

Without loss of generally, the following description of one backup operation to a designated hard drive activated in one time period is meant for illustration only. Repetitive backup operations and activations, backup and activation of multiple hard drives or backup operations to multiple data storage systems may be performed without departing from the scope of the invention.

At times when the programmatic activation schedule conditions are met, the data storage system causes power control module to activate the power supply to the designated hard drive by activating the corresponding power supply relay. The designated hard drive powers up for read/write operation accessible through the port multiplier during the period of programmatic activation. Independent of the data storage system operation and power control module activation of the designated hard drive, backup software initiates backup of a specified data source on the network server, host computer, or other network-accessible data source. The backup software transfers or causes to be transferred data from the backup data source to the designated hard drive via the port multiplier.

Successful transfers of data to the port multiplier and storage on the hard drive are acknowledged or a failure notice is sent to the backup operation for appropriate handling. As such, where the programmatic schedule does not activate the designated hard drive during the prescribed backup period (i.e. lacks coordination), the backup software operation will fail and users or system administers notified accordingly. Operation of the backup software continues for all scheduled data transfers to the designated hard drive, or until such time as the programmatic activation schedule causes power control module to deactivate the hard drive. Deactivation of the power supply relay removes power from the hard drive at the end of the programmatic activation period. The hard drive becomes unavailable for further operations and remains completely inaccessible until the next activation.

By way of example only, FIGS. 3A, 3B, and 3C described below depict such independent, coordinated operation illustrating the operation of the data storage system during one such backup software operation.

To begin, FIG. 3A depicts steps for the operation of the controlled access data storage system 100 for use with a backup operation for business-critical data stored on network servers, host computers, and other network devices. Installation and initialization of hard drives 120 proceed according to known methods of installation, partitioning, formatting, and volume assignment and identification. One or more hard drives 120 are installed in hot swap cage 130. Hard drives are powered on and initialized and/or formatted. For such initialization, hard drives 120 may be powered on by manual activation controls 130 or by programming interface 200 or external programming device 210 connected to data storage system 100 as above or to power control module 140. Once initialized hard drives are powered down until activation by the programmatic schedule or by manual override as previously described.

Referring again to FIG. 3A, at step 302, a system administrator or user gains access to a backup server or host computer backup software. Proceeding to step 304, the backup operation schedule is setup according to the needs of the business-critical data. Periodic backups may be scheduled according to nature and criticality of the data to be stored. The frequency of periodic backups may be determined by the importance and/or cost of avoidance of system disruption or data loss, the rate of change of the data, the volume of data, and other factors according to the business needs of the organization and/or its industry. For example, financial and legal data may require full or partial backup on a daily or hourly schedule. Transactional data may require more frequent or less frequent backups. Backup schedules may require full archival of all or selected or partial data stores on an hourly or nightly schedule, or on a weekly or monthly schedule with incremental backups of changed data in an intervening time frame. Backup schedules may be configured by software on a network server or by software on individual host computers. Network software such as Acronis™ True Image may be used to configure and initiate backup schedules by specifying by the data to be stored, its location on the network server or host computer, the time and day of the week at which backup is to commence, the specific volumes to be backed up, and the destination of the backup storage device. Once configured by a user or system administrator, at step 306 the backup software automatically executes the backup schedule accordingly. The backup operation may then repeat (step 308) one or more times or run continuously according to the frequency and time period of periodic backups.

FIG. 3B depicts the independent setup and operation of data storage system according to one method of the present invention. At step 312, an authorized user gains access to the programming interface and/or connects an external programming device to the data storage system or the power control module directly as previously described in reference to FIG. 2 above. At step 314, using the programming interface or device, the user sets or updates the programmatic activation schedule of hard drives according to the anticipated need for access by the backup software. User then disconnects the external programming device (if employed) from the data storage system. At step 316, under the control of the power control module according to the stored programmatic schedule, when the specified conditions are met for activation, the power supply to one or more hard drives is turned on by the power control module. Activation of the hard drive continues through drive access period 318, followed by deactivation of the drive in step 320. Activation may then repeat at step 322 when the specified conditions are next met for activation of drives according to the stored programmatic schedule.

Figure 3C:
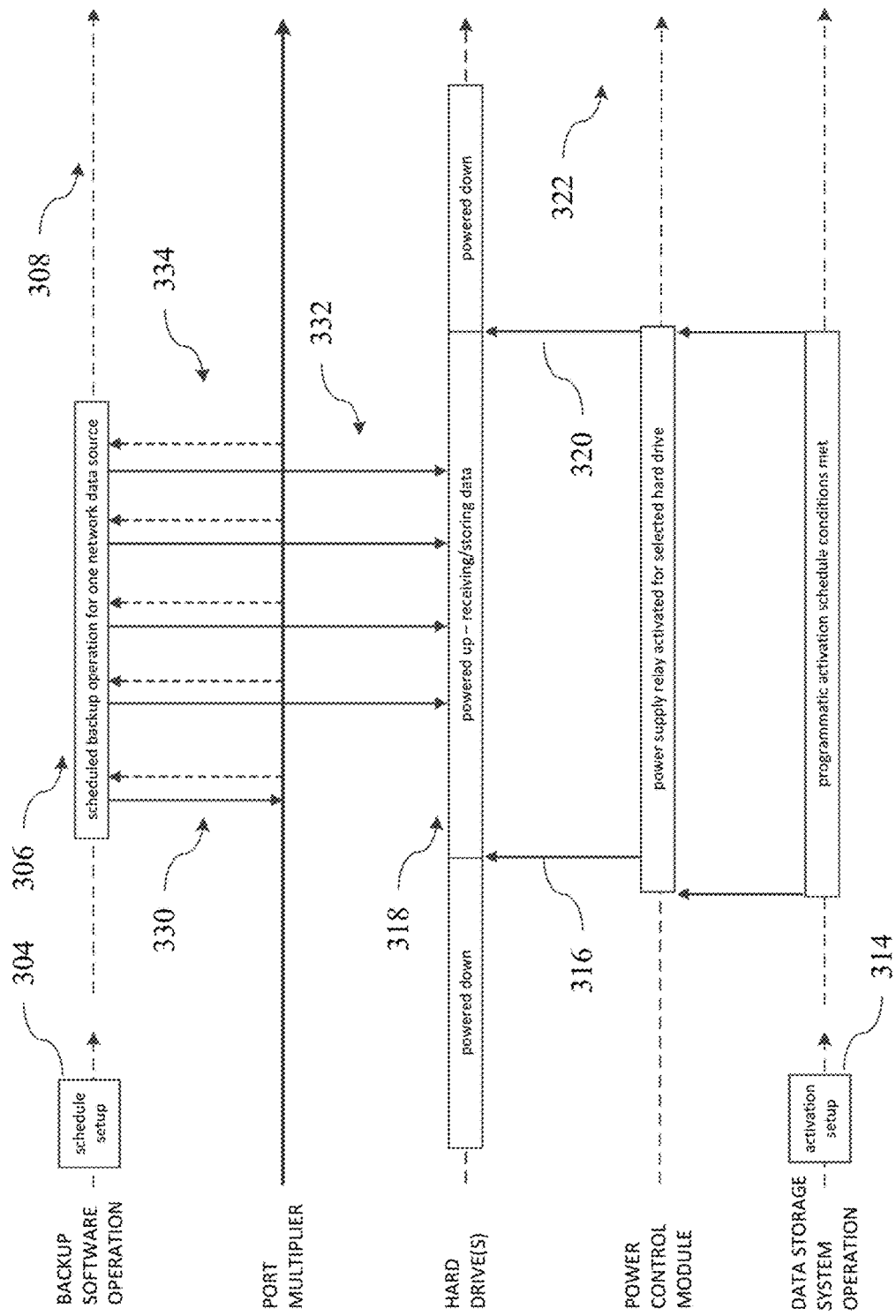
FIG. 3C illustrates a timeline of a typical data backup software operation in coordination with the programmatic activation schedule according to one instance of the invention.

FIG. 3C depicts a timeline of independent operation of the backup software and the data storage system according to the steps of FIGS. 3A and 3B. Following the operation illustrated and described for FIG. 3A above, once configured (step 304) the backup software initiates transfers to the destination hard drives during the schedule backup period (step 306). Following the operation illustrated and described for FIG. 3B above, one configured (step 314), the data storage system under the control of the power control module activates (step 316) one or more hard drives for access through the port multiplier during the drive access period (step 318). During such scheduled backup operation, the backup software communicates or directs communication with the data storage system through the port multiplier (step 330) receiving messages of acknowledgement or error for each attempted data transfer (steps 334). During such time as the programmatic schedule of activation of the hard drives remains valid, the power control module continues activation allowing the transfers of data (steps 332) to the hard drive(s). Upon reaching the end of the programmatic activation schedule the power control module deactivates the hard drive(s) (step 320).

Alternatively, the present invention enables backup operations by manually initiating storage of data from any networked data source other than by automatic scheduled backup. Furthermore, manual initiation of backup operations outside of a programmatic schedule of activation under the control of the power control module may be initiated by manual activation of the destination hard drive using manual overrides previously described. Manual activation of the hard drives for temporary use may be timed activations according to a default or programmed activation interval, or may remain on until manually deactivated or deactivated according to a programmatic schedule ensuring deactivation during certain time periods or calendar dates.

In use with the present invention, where the controlled-access data storage system is the destination for backup data, the backup software initiates a backup operation for each data source, assigning to the operation one or more of the hard drives of the data storage system. Unlike conventional data storage systems, however, making the destination hard drives continuously available for backup storage access would defeat the substantial purpose of controlling access to the hard drives for limited times. Similarly, providing control over activation of the hard drives to the backup software during such scheduled backup operations would expose the data storage system to malicious software also having with network access or to viruses that commandeer the backup software itself. Accordingly, in operation of the present invention, backup software on the network is coordinated by scheduling and operation independent of the programmatic schedule of hard drive activation by the data storage system and methods described herein.

Example Recovery Operation

Automated recovery operations similarly requires coordination of recovery software (typically the same as the backup software) with the programmatic schedule. Thus, according to one aspect of the invention, a recovery operation may be pre-scheduled according to recovery software setup and under the control of a network server or host computer. More typically, however, restoring data after a data loss is a manual, one-time operation involving one or more hard drives. Recovery operations may include restoring recovery data to the network server or host computer on demand. Manual initiation of such data recovery by the present invention may be initiated using manual override module as described above for activation of a selected hard drive containing the desired recovery data. Recovery operations may include a complete restoration of an entire or partial data storage device previously imaged to a hard drive of the data storage system. Network software such as Acronis™ True Image may be used to initiate recovery by specifying by the data to be recovered and destination locations on the network server or host computer, the specific volumes to be recovered, and the target source drives of the data storage system. Other recovery operations may be initiated by generally available operating system and file sharing or other network access mechanisms not under the control of specific recovery software and without loss of general application of the present invention.

By way of example only, FIGS. 4A, 4B, and 4C described below depict such coordinated operation illustrating the operation of the data storage system during one such recovery operation. To begin, at step 402 of FIG. 4A a system administrator or user gains access to a recovery server or host computer recovery software. Proceeding to step 404, the recovery operation is launched according to the need for recovery of lost or corrupted data to be accessed and restored from target drives of the data storage system. It is noted that the reasons for initiating a recovery may include needs other than lost or corrupted data without loss of generality. At step 406, the recovery software initiates recovery of data from target hard drives of the data storage system. The recovery operation may then be repeated (step 408) one or more times according to the needs for data recovery.

Figure 4B:
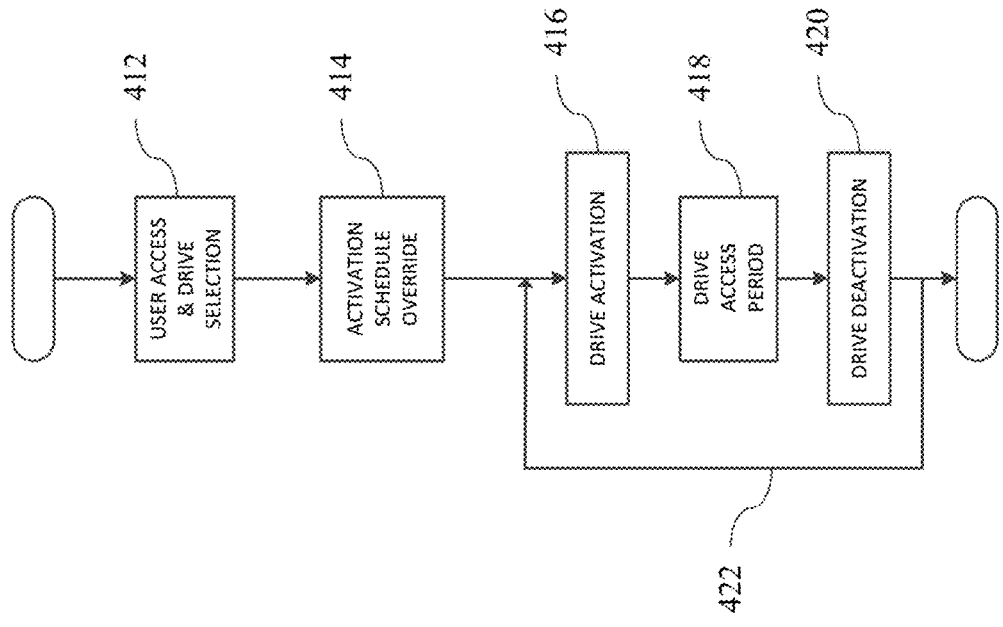
FIGS. 4A and 4B illustrate independent initiation of the recovery software and manual activation override and recovery operation according to one aspect of the invention.

FIG. 4B depicts the independent operation of data storage system in a recovery operation according to one method of the present invention. At step 412, an authorized user gains access to the data storage system and selects and/or installs one or more target drives for installation and recovery as previously described in reference to FIG. 2 above. At step 414, using the programming interface or device or the manual override module, the user activates the selected hard drives according to the need for recovery by the recovery software operation. At step 416, under the control of the power control module, the power supply to one or more hard drives is turned on by the power control module. Activation of the hard drive continues through drive access period 418 followed by manual or timed deactivation of the drive in step 420. Activation may then repeat (step 422) during a subsequent recovery operation.

Figure 4A:
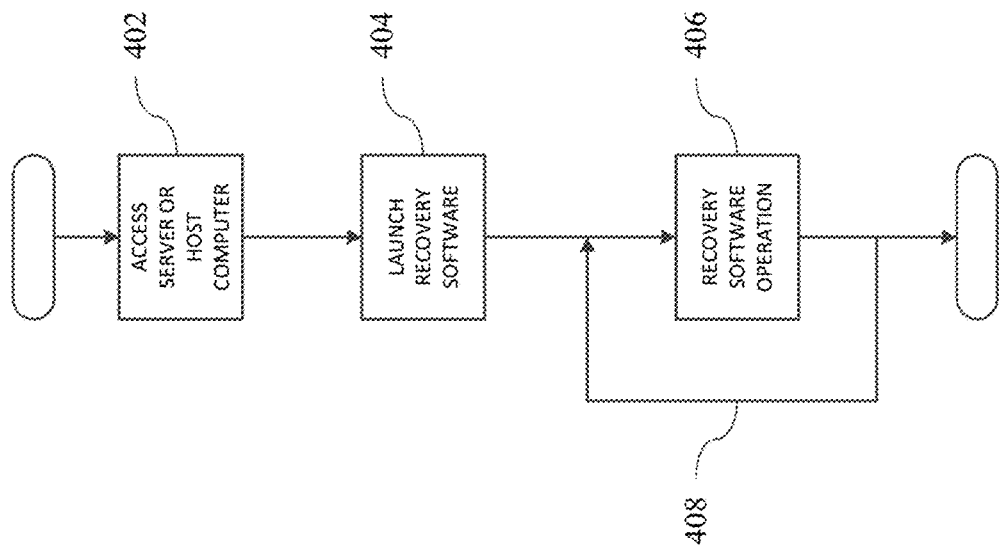
Figure 4C:
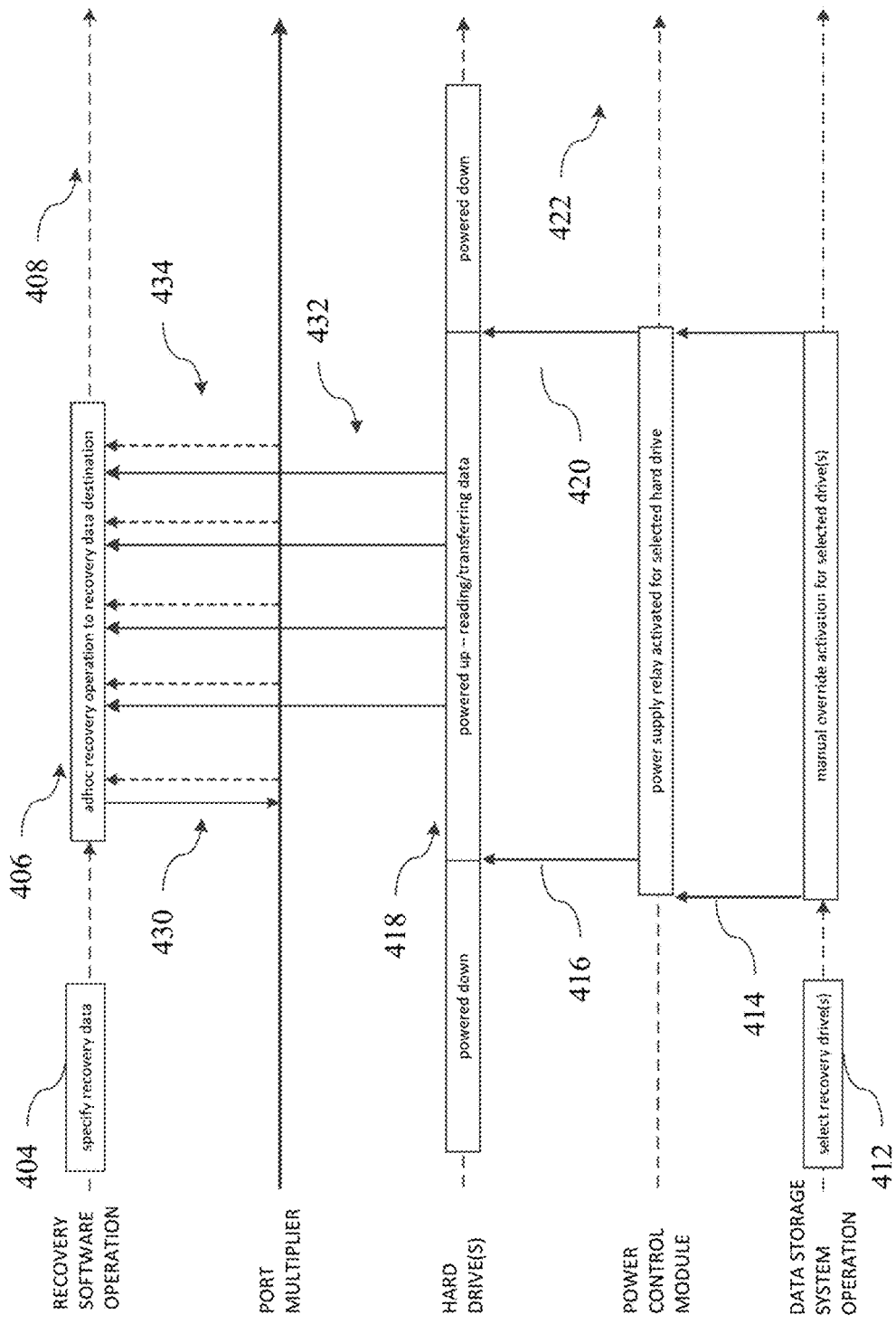
FIG. 4C illustrates a timeline of a typical data recovery operation in coordination with the manual activation override according to one instance of the invention.

FIG. 4C depicts a timeline of such independent operation of the recovery software and the data storage system according to the steps of FIGS. 4A and 4B. Following the operation illustrated and described for FIG. 4A above, once specified (step 404) the recovery software initiates transfers from the target hard drive(s) (step 406). Following the operation illustrated and described for FIG. 4B above, once the programmatic activation schedule is overridden or interrupted (step 414), the data storage system under the control of the power control module activates (step 416) one or more hard drives for access through the port multiplier during the drive access period (step 418). During such recovery operation, the recovery software communicates or directs communication with the data storage system through the port multiplier (step 430) receiving messages of acknowledgement or error for each attempted data transfers (434). During such time as the power control module continues activation, transfers of data (432) from the activated hard drive(s) via the port multiplier to the recovery server or host computer are allowed. Upon reaching the end of the activation period or by manual control, the power control module deactivates the hard drive(s) (step 420).

As such, in use with the present invention, where the controlled-access data storage system is the source for recovery data, the recovery software initiates a recovery operation from one or more of the hard drives of the data storage system. Unlike conventional data storage systems, however, making the hard drives continuously available for recovery access would defeat the substantial purpose of controlling access to the hard drives for limited times. Similarly, providing control over activation of the hard drives to the recovery software during such recovery operations would expose the data storage system to malicious software also having with network access or to viruses that commandeer the recovery software itself. Accordingly, in operation of the present invention, recovery software on the network is coordinated by operations independent of the hard drive activation by the methods described herein.

By limiting network access to the hard drives of the data storage system to only such times and dates as read/write capability is necessary to perform backup, recovery, and other necessary, time-limited functions, the data storage system of the present invention minimizes opportunity for unauthorized access by malicious computer codes infecting the network or host computer system. Preventing unauthorized access by requiring physical access to the controlled-access data storage system to configure, set, change and initiate programmatic schedules, or to manually activate individual hard drives, provides secure retention of critical user and business information in support regulatory compliance, accounting audits, review and recovery of data systems after a breach in network security by electronic intrusion.

Example Computing Devices

Figure 5:
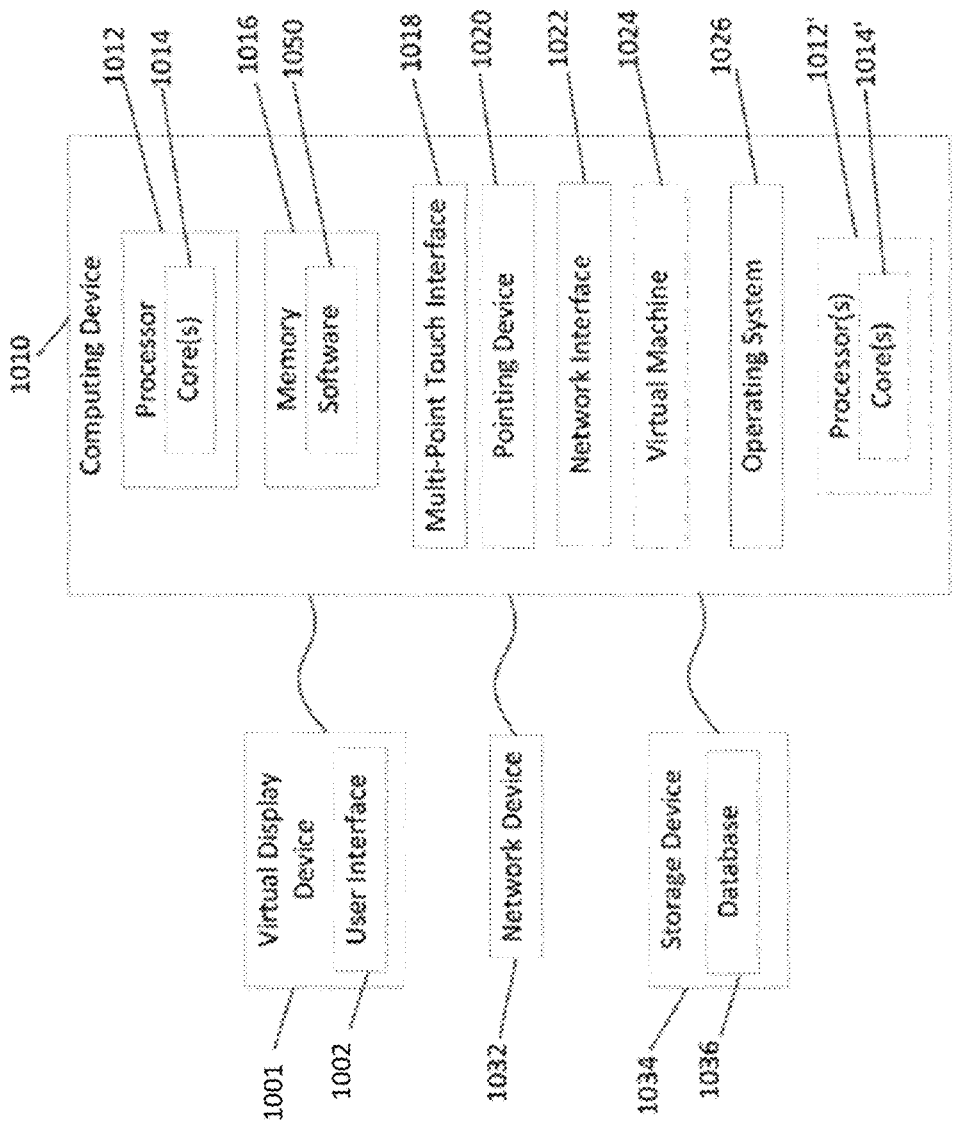
FIG. 5 is an example computational device block diagram depicting various components that can be used to implement various of the disclosed embodiments.

FIG. 5 is a block diagram of an exemplary computing device 1010 such as can be used, or portions thereof, in accordance with various embodiments as described above with reference to FIGS. 1-4C. The computing device 1010 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more flash drives), and the like. For example, memory 1016 included in the computing device 1010 can store computer-readable and computer-executable instructions or software for performing the operations disclosed herein. For example, the memory can store software application 1040 which is programmed to perform various of the disclosed operations as discussed with respect to FIGS. 1-4C. The computing device 1010 can also include configurable and/or programmable processor 1012 and associated core 1014, and optionally, one or more additional configurable and/or programmable processing devices, e.g., processor(s) 1012' and associated core (s) 1014' (for example, in the case of computational devices having multiple processors/cores), for executing computer-readable and computer-executable instructions or software stored in the memory 1016 and other programs for controlling system hardware. Processor 1012 and processor(s) 1012' can each be a single core processor or multiple core (1014 and 1014') processor.

Virtualization can be employed in the computing device 1010 so that infrastructure and resources in the computing device can be shared dynamically. A virtual machine 1024 can be provided to handle a process running on multiple processors so that the process appears to be using only one computing resource rather than multiple computing resources. Multiple virtual machines can also be used with one processor.

Memory 1016 can include a computational device memory or random access memory, such as but not limited to DRAM, SRAM, EDO RAM, and the like. Memory 1016 can include other types of memory as well, or combinations thereof A user can interact with the computing device 1010 through a visual display device 1001, such as a computer monitor, touchscreen, mobile device screen, or other device which can display one or more user interfaces that can be provided in accordance with exemplary embodiments. The computing device 1010 can include other I/O devices for receiving input from a user, for example, a keyboard or any suitable multi-point touch interface 1018, a pointing device 1020 (e.g., a mouse). The keyboard 1018 and the pointing device 1020 can be coupled to the visual display device 1001. The computing device 1010 can include other suitable conventional I/O peripherals.

The computing device 1010 can also include one or more storage devices 1034, such as but not limited to a hard-drive, CD-ROM, or other computer readable media, for storing data and computer-readable instructions and/or software that perform operations disclosed herein. Exemplary storage device 1034 can also store one or more databases for storing any suitable information required to implement exemplary embodiments. The databases can be updated manually or automatically at any suitable time to add, delete, and/or update one or more items in the databases.

The computing device 1010 can include a network interface 1022 configured to interface via one or more network devices 1032 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1022 can include a built-in network adapter, network interface card, PCMCIA network card, card bus network adapter, wireless network adapter, USB network adapter, modem or any other device suitable for interfacing the computing device 1010 to any type of network capable of communication and performing the operations described herein. Moreover, the computing device 1010 can be any computational device, such as a workstation, desktop computer, server, laptop, handheld computer, tablet computer, or other form of computing or telecommunications device that is capable of communication and that has sufficient processor power and memory capacity to perform the operations described herein.

The computing device 1010 can run any operating system 1026, such as any of the versions of the Microsoft® Windows® operating systems (Microsoft, Redmond, Wash.), the different releases of the Unix and Linux operating systems, any version of the MAC OS® (Apple, Inc., Cupertino, Calif.) operating system for Macintosh computers, any embedded operating system, any real-time operating system, any open source operating system, any proprietary operating system, or any other operating system capable of running on the computing device and performing the operations described herein. In exemplary embodiments, the operating system 1026 can be run in native mode or emulated mode.

In an exemplary embodiment, the operating system 1026 can be run on one or more cloud machine instances.

While the foregoing description of the invention enables one of ordinary skill to make and use what is considered presently to be the best mode thereof, those of ordinary skill will understand and appreciate the existence of variations, combinations, and equivalents of the specific embodiments and examples herein. The above-described embodiments of the present invention are intended to be examples only.

Those of skill in the art may effect alterations, modifications and variations to the particular embodiments without departing from the scope of the invention, which is defined solely by the claims appended hereto. The invention is therefore not limited by the above-described embodiments and examples, embodiments, and applications within the scope and spirit of the invention claimed as follows.

We claim:

1. A controlled access data storage system comprising:
a plurality of data storage units housed in a support enclosure;
a port multiplier for providing data access to the plurality of data storage units; and
a power control module for providing programmatic activation of one or more of the plurality of data storage units according to a time-based schedule,
wherein the programmatic activation schedule operates independently of data transfer operations associated with a network or networked device, the data transfer operations configured to access, via the network, one or more of the plurality of data storage units;
wherein the programmatic activation schedule is configurable only via manual interaction by a user with at least one of:
a programming interface mounted on or within the support enclosure in communication with the power control module, or
an external programming device physically connected by a communications cable to the power control module,
wherein the power control module is not networked such that proximate physical access to the controlled access data storage system by the user is required during execution of the manual interaction with the at least one of the programming interface or the external programming device in order to configure the programmatic activation schedule.

2. The system of claim 1, wherein the support enclosure is a hot swap cage.

3. The system of claim 2, wherein the hot swap cage provides power supply to individual data storage units individually controllable by the power control module.

4. The system of claim 3, wherein the power supply to each of the plurality of data storage units is comprised of one or more power supply voltages supplying all or partial power needs of the data storage units.

5. The system of claim 1, wherein the plurality of data storage units are selected from the group comprising magnetic and optical drives, flash drives, thumb drives, and static random-access memory drives.

6. The system of claim 1, wherein at least one of the programming interface or the external programming device is configured to define and initiate the programmatic activation schedule, wherein the programming interface or external programming device is accessible only to authorized users in physical proximity to the data storage system.

7. The system of claim 1, wherein the data storage system is housed in a self-contained enclosure.

8. The system of claim 1, wherein the data storage system resides on a printed circuit board.

9. The system of claim 1, further comprising a manual override module for manual activation of one or more of the plurality of data storage units.

10. The system of claim 9, wherein the manual override module is controllable by the programming interface to independently manually activate one or more of the data storage units.

11. The system of claim 9, wherein the manual override module further comprises one or more push button switches to independently manually activate one or more of the data storage units.

12. A method for providing controlled access to a data storage system comprising:
   manually interacting, by an authorized user, with at least one of a programming interface or an external programming device, the at least one of the programming interface or the external programming device in electronic communication with a power control module of a data storage system, wherein the power control module is not networked such that proximate physical access to the data storage system by the user is required during execution of the manual interaction with the at least one of the programming interface or the external programming device;
   configuring, by the manual interaction, while physically accessing the data storage system, the power control module to execute a programmatic activation schedule for independently activating one or more data storage units of the data storage system, the programmatic activation schedule operating independently of a data transfer operation associated with a network or networked device, the data transfer operation configured to access, via the network, one or more of the plurality of data storage units; and
   activating, by the programmatic activation schedule, at least one of the data storage units during the data transfer operation.

13. The method of claim 12, further comprising configuring one or more data storage units in a support enclosure by the steps of:
   installing one or more of the data storage units in the support enclosure;
   activating a power supply for powering the one or more installed data storage units;
   initializing the one or more data storage units for data transfer access through port multiplier; and
   deactivating the one or more data storage units.

14. The method of claim 12, wherein the programmatic activation schedule is configured to be overridden by physical user access to a manual override module.

15. The method of claim 12, wherein the data transfer operation is a data backup operation.

16. The method of claim 12, wherein the data transfer operation is a data recovery operation.

17. The method of claim 15, wherein activation of the one or more data storage units for access by the data backup operation is by manual override of the programmatic activation schedule.

18. The method of claim 16, wherein activation of the one or more data storage units for access by the data recovery operation is by manual override of the programmatic activation schedule.

* * * * *